United States Patent [19]

Laroche

[11] Patent Number: 4,879,321

[45] Date of Patent: Nov. 7, 1989

[54] ARTICLES OF FILLED SYNTHETIC POLYMERIC MATERIALS AND GLASS BEAD FILLER THEREFOR

[75] Inventor: Pierre Laroche, Nalinnes, Belgium

[73] Assignee: Glaverbel, Brussels, Belgium

[21] Appl. No.: 175,287

[22] Filed: Mar. 30, 1988

Related U.S. Application Data

[60] Division of Ser. No. 041,667, Apr. 20, 1987, Pat. No. 4,761,440, which is a continuation of Ser. No. 754,452, Jul. 11, 1985, abandoned.

[30] Foreign Application Priority Data

Jul. 12, 1984 [GB] United Kingdom ................ 8417740

[51] Int. Cl.$^4$ ............................ C08K 9/00; C08K 9/06
[52] U.S. Cl. .................................... 523/203; 523/205; 523/206; 523/209; 523/214; 523/217; 428/405; 428/406; 428/407
[58] Field of Search ............... 523/205, 209, 203, 206, 523/214, 217; 428/405, 406, 407

[56] References Cited

U.S. PATENT DOCUMENTS

| | | |
|---|---|---|
| 3,893,969 | 7/1975 | Newbould ............................ 523/209 |
| 3,894,169 | 7/1975 | Miller ................................ 428/317.9 |
| 3,901,845 | 8/1975 | Newbould ............................ 523/216 |
| 3,971,753 | 7/1976 | Frechtling et al. ................. 523/218 |
| 4,243,575 | 1/1981 | Myers et al. . |
| 4,305,863 | 12/1981 | Adachi et al. ...................... 523/214 |
| 4,336,301 | 6/1982 | Shaw .................................... 428/327 |
| 4,609,591 | 9/1986 | Pollet et al. ......................... 523/206 |
| 4,713,295 | 12/1987 | Laroche .............................. 428/406 |
| 4,764,544 | 8/1988 | Carey et al. ........................ 523/206 |

FOREIGN PATENT DOCUMENTS

| | | |
|---|---|---|
| 0045949 | 2/1982 | European Pat. Off. . |
| 0180472 | 5/1986 | European Pat. Off. ............ 523/206 |
| 2319662 | 5/1977 | France . |
| 0903090 | 8/1962 | United Kingdom . |
| 1436997 | 10/1976 | United Kingdom . |
| 1520856 | 7/1978 | United Kingdom . |
| 1577509 | 4/1980 | United Kingdom . |

OTHER PUBLICATIONS

Derwent Abstract 80-55714c/32, Janome Sewing J 55082156, Jun. 1980.
Derwent Abstract 83-835149/49, Janome Sewing J 58094887, Jun. 1983.
Darrel Muck et al., "Plastics Compounding", Jan.-/Feb., 1979, p. 12.

*Primary Examiner*—Herbert J. Lilling
*Attorney, Agent, or Firm*—Spencer & Frank

[57] ABSTRACT

In or for a polymeric article incorporating a synthetic polymer and a filler material, which filler material includes glass beads bearing coatings of at least one coating agent in a total coating amount not exceeding 1%, and preferably between 0.02% and 0.2%, by weight based on the weight of uncoated beads, which coatings limit adhesion between the glass beads and the synthetic polymer and confer an increased impact resistance on the article as compared with an article which includes uncoated glass beads as filler material but is otherwise identical. Preferred coating materials include silanes, fluorocarbon compounds and synthetic polymers having shockabsorbing properties, especially synthetic polymers having a glass transition temperature (Tg), determined by differential scanning calorimetry, which is lower than 15° C.

13 Claims, 1 Drawing Sheet

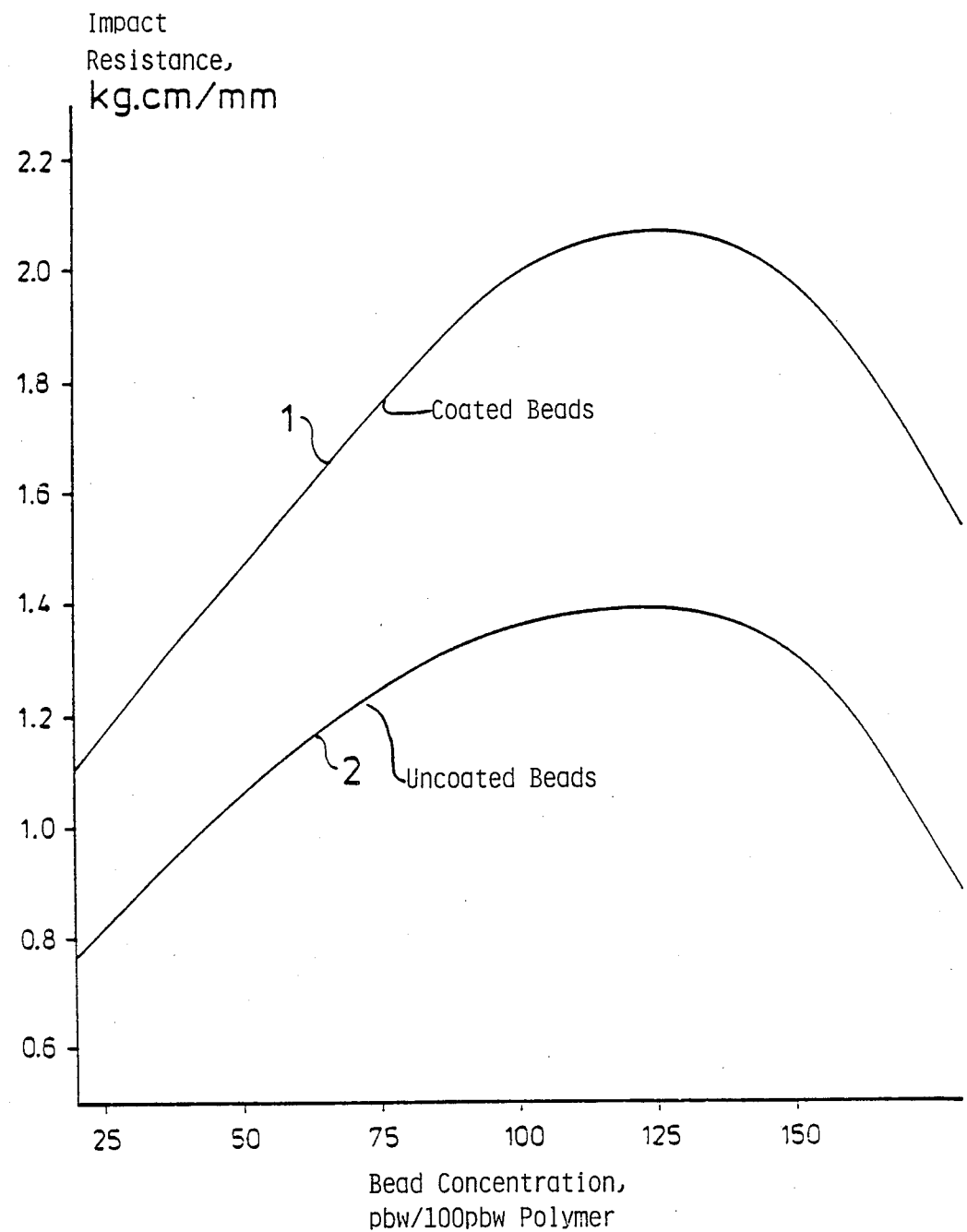

ARTICLES OF FILLED SYNTHETIC POLYMERIC MATERIALS AND GLASS BEAD FILLER THEREFOR

This is a division of application Ser. No. 041,667 filed Apr. 20, 1987, now U.S. Pat. No. 4,761,440, which is a continuation of application Ser. No. 754,452 filed July 11, 1985, now abandoned.

BACKGROUND OF THE INVENTION

1. Field of the Invention

The present invention relates to synthetic polymeric articles incorporating glass beads as filler material, and to glass bead filler materials for use in the preparation of such articles.

2. Discussion of the Art

It is well known to fill synthetic polymeric materials with glass beads. Depending on: (a) the specifications of the beads, (b) the treatment, if any, to which the beads are subjected before being mixed with the synthetic polymer or synthetic precursor, and (c) the beads/synthetic polymer quantity ratio, the presence of the filler can facilitate working of the compounded material and can, in various respects, enhance some mechanical properties of articles formed from the material. Spherical glass beads, for example, are capable of improving stress distribution within moulded articles as well as facilitating the moulding process itself. All these facts are well known (see, e.g., "Glass microspheres: bubbles and beads as plastics additives" by Darrel L. Muck and James R. Ritter, Plastics Compounding, January/February 1979, page 12.

It is recognised in the art that while glass beads, used as a synthetic polymer filler, can result in some improvement in various mechanical strength properties of articles formed from the synthetic polymeric material, such as their flexibility and tensile strength, the presence of the beads often has an adverse effect on the impact strength of the articles. This is particularly the case when using solid, as distinct from hollow, glass beads.

SUMMARY OF THE INVENTION

The present invention enables this adverse effect on impact strength to be avoided or reduced.

The invention is based on the discovery that a degree of shock-resistance can be given to articles moulded from the filled synthetic polymer by suitably surface coating the glass beads used as filler.

According to the present invention, there is provided a synthetic polymer article incorporating glass beads as filler material, characterised in that the glass bead filler material comprises beads bearing coatings of at least one coating agent in a total coating amount not exceeding 1% by weight of the uncoated beads, which coatings limit adhesion between the glass and the synthetic polymeric material and confer an increased impact resistance on the article as compared with an article which includes uncoated glass beads as filler but is otherwise identical.

The invention also includes mouldable or otherwise formable synthetic polymeric material incorporating glass beads as a filler, characterised in that the beads bear coatings of at least one coating agent in a total coating amount not exceeding 1% by weight of the uncoated beads, which coatings limit adhesion between the glass and the synthetic polymeric material and confer an increased impact resistance on articles when formed from such filled synthetic polymeric material as compared with an article which includes uncoated glass beads as filler but is otherwise identical.

It is surprising that a significant improvement in impact strength can be achieved merely by applying a rather thin surface coating to the beads. As will hereafter be exemplified it has been found that impact strength can easily be increased by over 20% simply by appropriately coating the beads.

BRIEF DESCRIPTION OF THE DRAWINGS

The sole FIGURE is a graph comparing the impact resistance of sheets of epoxy-amine resin filled with solid glass beads as a function of bead concentration for styrene-butadiene coated beads (curve 1) and uncoated beads (curve 2).

DESCRIPTION OF THE PREFERRED EMBODIMENTS

It is not necessary to form very thick coatings on the glass beads. In preferred embodiments of the invention, said coating amount is between 0.02% and 0.2% by weight of the uncoated beads. We have found that the use of such quantities of coating agent is not only beneficial for reasons of economy, but also that it tends to promote an increase in impact strength. Preferably, said coating amount is not more that 0.1% by weight of the uncoated beads. Good results have been obtained, for example, when using polymeric coating material in an amount of about 0.2 to 1.0 g per kg of glass beads having a specific surface of 0.3 $m^2/cm^3$.

Various methods are available for testing the impact strength of a specimen product. One particularly appropriate test for materials of the kind under consideration is ASTM Test D 2794 which determines the effect of the impact of a dart. Another is the generally similar Gardner test, and a third is the Charpy test. Impact resistance values given in this specification are values determined by one of these tests.

Adhesion between the glass and the synthetic polymeric material may for example, be limited by using a coating agent which bonds well to glass but has a limited adherence to synthetic polymeric material, or by using a coating agent which bonds well to synthetic polymeric materials, but less well to glass.

Various coating agents having a limited adherence to synthetic polymeric materials may be used in the performance of this invention. Among such coating agents are silicones, silanes—especially silicon-functional silanes, and oleophobic fluorocarbon compounds. It is preferred that said coatings comprise a silane and/or a fluorocarbon compound. Such materials can be arranged to bond well to glass, while having a limited capacity to adhere to synthetic polymeric materials. This has the advantage of forming a coating which confers the required properties while at the same time being resistant to removal from the beads during handling prior to incorporation in a synthetic polymeric material. Very good results have been achieved using a silane which is an alkyl-silane or an aryl-silane, as is preferred, and it is especially preferred to use methylsilane or phenyl-silane. In embodiments of the invention making use of a fluorocarbon compound coating agent, it has been found preferable to use an anionic fluorocarbon compound, and in particular a fluoro-alkyl-sulphonate, since this gives good results.

In some preferred embodiments of the invention, said coatings comprise a synthetic polymeric material having shock-absorbing properties. In general it is found that such coatings adhere less well to glass beads, and so are more apt to be removed by careless handling prior to incorporation in synthetic polymeric material as filler, but it has been found that when so incorporated beads coated in this way tend to confer a greater improvement in impact strength on synthetic polymeric articles.

Suitable synthetic polymeric materials for coating beads for use in the manufacture of products according to this invention include elastomers properly so called and other polymers incorporating chain units or segments which undergo straightening or change in orientation under stress, with consequent energy-absorption. In view of the use to which the coated beads are put, such coating material must normally be capable of energy absorption at ordinary room temperature which implies a low glass transition ($T_g$) temperature. Such an energy-absorbing synthetic polymeric material is preferably a material for which the glass transition temperature ($T_g$), determined by differential scanning calorimetry, is lower that 15° C.

Prior to coating the beads with a synthetic polymeric material, they can be treated with a coupling agent to promote required adhesion of the polymer coating to the beads, and it is preferred that the adhesion of said polymeric coatings to the glass beads is influenced by the presence of a coupling agent comprising a silane. It is well known to employ coupling agents for improving the interfacial bond between a mouldable synthetic polymeric matrix and glass beads which are incoporated therein as filler. The coupling agents used for this purpose are customarily selected to achieve as strong an interfacial bond as possible because a strong adhesion benefits various strength properties, for example, the flexural strength and modulus of the composite material. However, when selecting a coupling agent for influencing the interfacial bond between glass beads and polymeric surface coatings prior to incorporation of the coated beads into the synthetic polymeric matrix material to produce a composite according to the present invention, other considerations apply. It has been found that while it is important for the bead coating material to adhere to the beads, any coupling agent used should not be selected with the object of making the interfacial bond as strong as possible because a very high strength is not helpful to the main purpose for which the beads are coated. A very strong adhesion can prevent full exploitation of the ability of the coatings to improve the impact strength of a formed article. If the structure of the polymeric, bead coating material comprises segments or groups of different energy-absorbing potentials the coupling agent can be selected to anchor the polymer via its rigid or less deformable sturctural segments or units, leaving the other parts of the molecular structure free to undergo reorientation under stress. The strength of the interfacial bond actually achieved can be controlled by mixing one coupling compound with another to form a composite coupling agent, and it is especially preferred that said coupling agent comprises a mixture of different silanes and forms an interfacial bond of a strength intermediate that attainable by either component if used alone.

A particularly suitable energy-absorbing coating is one formed of a styrene-butadiene copolymer such as that commercially available from Polysar Europe S.A. of Zwijndrecht, Belgium and designated X818. In a styrene-butadiene copolymer, the styrene units have a $T_g$ of 60°–70° C., but the $T_g$ of the butadiene units, which are responsible for the required energy-absorbing property of the material, is below 15° C. Another useful bead coating material is copoly($NH_2$-butadiene-acrylonitrile-$NH_2$). Also, copoly(butylacrylate-epoxyacrylate) can be used. However there are reservations in recommending the latter material because acrylic polymers have poor resistance to temperatures which are normally (depending on the composition of the synthetic polymeric matrix material) employed in moulding operations.

The bead coatings can be formed by application of the coating material as a solution or as a latex (aqueous suspension). It suffices for the beads to be immersed in the coating material, drained and dried.

Glass beads of any of a wide range of specifications can be selected for use in carrying out the present invention. The size and form of the beads are of influence, as known per se in relation to fillers, on the properties of articles formed from the composite material. In the most important embodiments of the invention the beads are solid. Solid beads are particularly preferred as filler for thermoplastic resins because of their greater crush resistance. The invention enables the particular benefits of solid glass beads as a filler, including their inherent strength which is an advantage for the forming operation as well as for the properties of the moulded product, to be combined with that of a higher product impact strength than that which would normally be attainable with such beads. Normally, the lowering of impact strength resulting from the use of glass beads as synthetic polymer filler is particularly marked if the beads are solid.

The glass beads used in carrying out the invention are preferably spherical in order to realise the benefits for the flow properties of the filled synthetic polymer, and in order to promote even stress distribution within articles formed therefrom, which is known to be associated with a filler of that form.

The size of the beads is a factor which influences the properties of a material according to the present invention in the same way as in known materials using uncoated glass beads as the filler. It is generally appropriate to use beads less than 500 μm in diameter and for most purposes it is recommended to use beads of a much smaller maximum diameter, for example, beads of diameters less than 200 μm.

The beads preferably have a narrow size range distribution (and therefore a low apparent bulk density) because they can then be better distributed in the formable matrix material so that shock is transmitted through the resin and not directly from bead to bead. Preferably their apparent bulk density is from 1.5 to 1.55. If the beads are confined to a narrow size range, the viscosity of the formable material incorporating the beads increases steeply with increase in the bead/matrix quantity ratio and this must be taken into account when selecting this ratio for a particular composite material.

In certain articles and materials according to the invention, the glass beads have a granulometry such that 90% of the beads have a diameter smaller than a length x and 10% of the beads have a diameter smaller than a length y, the values of x and y being such that x−y is greater than 45 μm but smaller than 65 μm.

The beads are preferably made of a soda-lime glass (A glass).

An article or formable material according to the invention can incorporate filler comprising the coated glass beads and at least one other kind of discrete material. For example the filler may comprise in addition to the coated glass beads, a finely divided material which modifies the bulk density of the filler. Such a finely divided material can for example serve to reduce the extent to which the viscosity of the synthetic polymer/bead mixture increases with increase in the bead/synthetic polymer quantity ratio. Such finely divided material can, with advantage, be a hydrophobic, inorganic substance which is substantially chemically inert with respect to the beads and has a specific surface of at least 50 m$^2$/g. Compositions incorporating such a composite filler and wherein the said hydrophobic finely divided component is present in an amount not more than 5% by weight of the glass beads, are described and claimed in our copending U.K. patent application No. 83 31 375, filed Nov. 24, 1983. Particularly recommended materials for the finely divided hydrophobic component of the filler are the silicas commercially available from Degussa (Frankfurt) under their Trade Mark AEROSIL and from Cabot Corporation (Tuscola, Ill.) under their Trade Mark CAB-O-SIL.

The selection of the bead coating material for a particular kind of composite should take account of the composition of the mouldable matrix material into which the coated glass beads are to be incorporated. The strength of the interfacial bond between the bead coatings and the matrix is a factor which can influence the tensile and bending strengths of the product as well as its impact resistance. A low adhesion which is desirable for promoting impact strength can adversely affect bending strength and modulus, and if all of these factors are important for a given product, the selected combination of matrix material and adhesion limiting bead coating material should represent an appropriate compromise. The strength of the adhesion is dependent on the surface tension difference between the bead coatings and the matrix.

The synthetic polymeric matrix material can be a thermoplastic, for example, a polyamide or polystyrene, or a thermosetting resin, for example, an epoxy or polyester resin. Application of the invention in the manufacture of mouldable glass/polyamide composites and of glass/epoxy resin composites and of articles formed from such composites is considered to be of particular interest, both for technical and commercial reasons.

The mixing of the coated beads with the matrix material is easier if this material is in liquid state as is the case, for example, when using a two-component epoxy resin composition.

The quantity ratio of coated beads to synthetic polymeric matrix material is a factor of importance in various respects. The benefits for impact resistance increase, within a certain range, with the proportion of coated beads in the composite material. Above a certain concentration of the beads, the impact resistance begins to decrease because of direct bead to bead contacts.

The influence of bead concentration on impact resistance is represented by the accompanying drawing which is a graph in which impact resistance values appear on the ordinate and bead concentrations (in parts by weight of beads per 100 parts by weight of synthetic polymeric matrix material) on the abscissa. The two curves 1 and 2 both relate to articles formed from composites comprising an epoxy-amine resin mixture and solid glass beads as the synthetic polymer filler, the solid glass beads and the matrix material being that used in Example 1 given hereafter. Curve 1 relates to articles in which the glass bead were coated as in the Example 1. Curve 2 relates to articles in which the glass beads were uncoated. It will be seen that the impact resistance is greatly improved by the presence of the bead coatings. But for both the coated filler and the uncoated filler categories of article there is a maximum filler proportion above which the impact strength begins to decrease.

In the case of spherical beads, their presence facilitates the shaping of the composite, by injection or extrusion moulding or otherwise, and from all of these standpoints, as well as for cost reasons, a high proportion of beads is an advantage, but the proportion which can be used in any given product is limited by other considerations such as the influence of the beads on the viscosity of the composite material. When using the coated beads as a filler in thermoplastics, the proportion of coated beads is preferably from 30 to 40% by weight.

Composites according to the invention can be used in the manufacture of a wide variety of articles, for example, articles of houseware, machine and structural components and decorative and/or functional fittings. A specific example of articles in the latter category is an instrument panel such as for a vehicle.

The invention includes coated glass beads suitable for use as a synthetic polymer filler, said beads being characterised in that the beads bear surface coatings of synthetic polymeric material of which the glass transition temperature ($T_g$), determined by differential scanning calorimetry, is lower than 15° C.

The coated beads may and preferably do have any of the optional features hereinbefore referred to in relation to coated beads incorporated as filler into a composite according to the invention.

The following are examples of coated beads and of composites according to the invention:

EXAMPLE 1

A filler according to the present invention, for use in a synthetic polymeric matrix material was prepared by coating a batch of solid spherical glass beads with a polymeric coating material.

The mean diameter of the glass beads (i.e. the diameter which is such that half of the beads were above and half of them were below such mean) was 26 μm. 90% of the beads had a diameter below 58 μm and 10% had a diameter below 11 μm.

The beads were immersed in a latex, i.e., in an aqueous solution comprising a styrene-butadiene copolymer ($T_g$ of the butadiene units: below 15° C.) and a coupling agent comprising phenylsilane and aminosilane.

The beads wetted with such a latex were subsequently dried. The amount of copolymer forming the bead coatings was 1 g per kg of beads of which the specific surface was 0.3 m$^2$/cm$^3$. Such coatings have a negligible or very low adherence to epoxy resin and low adherence to the glass beads.

The foregoing coated beads according to the invention were then mixed in a weight ratio of 1:1 with a matrix composition comprising an epoxy resin designated 818 marketed by Shell International together with a polyamine hardener marketed under the Trade Mark VERSAMID 140 by General Mills Co. and the resulting mixture was formed by extrusion into an article according to the present invention, the article being in the form of a sheet 3 mm in thickness.

A disc of this sheet material having a diameter of 3 mm was subjected to ASTM Impact Resistance Test D 2794. The impact resistance of the composite was found to be 2.00 kg.cm/mm.

For purposes of comparison, a composite having the same composition except that the beads were not coated with the styrene-butadiene copolymer was formed into a sheet of the same thickness as the one above referred to and a sample of this further sheet material having the same dimensions as the above tested sample, was subjected to the same ASTD test. This sample was found to have an impact resistance of only 1.35 kg.cm/mm. A disc of the same size was formed from the copolymer alone, without filler, was also subjected to the same test. It had an impact resistance of about 2 kg.cm/mm.

EXAMPLE 2

A synthetic polymer filler according to the invention was prepared by coating a batch of solid spherical glass beads having a mean diameter of 46.5 μm, 90% of the beads being below 73 μm and 10% of them being below 28 μm in diameter. The beads were treated with coupling agent and coated with styrene-butadiene copolymer in the same way as the glass beads in Example 1.

The beads were used as filler in preparing a mouldable composite. The composite was prepared in the same way as in Example 1, using the same matrix material as in that Example, but the coated beads were used in a proportion of 33% by weight of the matrix material. Using the test referred to in Example 1, the impact resistance of the composite was found to be 1.77 kg.cm/mm. The impact resistance of a composite of the same composition except that the beads were uncoated was found to be 1.25 kg.cm/mm.

EXAMPLE 3

A filler according to the invention was prepared as in Example 1, but using a batch of solid spherical glass beads having a mean diameter of 66 μm, 90% of the beads being below 103 μm and 10% of them being below 42 μm in diameter. The beads were treated with coupling agent and coated with styrene-butadiene copolymer in the same way as the beads in Example 1.

The beads were used as a filler in preparing a mouldable composite. The composite was prepared in the same way as in Example 1, using the same matrix material and the same coated bead/matrix ratio. The impact resistance of the composite was again found to be improved by the presence of the bead coatings.

EXAMPLE 4

Coated beads identical with those used as the filler in Example 1 were used as the filler in a composite comprising Nylon 6/6 marketed under the Trade Mark MARANYL by Imperial Chemical Industries Limited. The bead coatings have an adherence to polyamides which is very low. The beads were used in a proportion of 15% by weight of the matrix material. The coated beads were mixed with the nylon powder within the screw of an extruder from which the composite was extruded as a rod. The rod was then cut into pieces which were supplied to an injection moulding apparatus for forming into moulded articles.

The impact resistance of such moulded articles, determined by the test used in Example 1, was 4.67 kg.cm/mm. Articles formed in the same way from a composite without the bead coatings, but otherwise identical, had an impact resistance of 3.67 kg.cm/mm.

Instead of mixing the coated beads and nylon within an extruder, they can be mixed in some other mixing appliance and the mixture can then be directly injection moulded. However, this is not so suitable a procedure for industrial scale operations.

An impact resistance better than that realised by the bead coatings in Example 4 was obtained when using an aliphatic polyurethane latex containing at least 10% of plasticiser for forming the bead coatings limiting adherence to the nylon instead of the styrene-butadiene polymer latex.

EXAMPLE 5

Various batches of glass beads having the granulometry set forth in Example 1 were mixed with nylon 6/6 powder in amounts of 30% by weight of the nylon and were moulded into plates 3 mm thick. The plates as moulded were then subjected to the Gardner notched impact test without aging. One batch of beads was left untreated prior to its incorporation into the synthetic polymeric material as a control, one batch was treated with a known efficacious adhesion promoting agent for comparison, namely amino-silane, and three further batches were treated with adhesion limiting agents in accordance with the invention. These agents were phenyl-silane, methyl-silane and an anionic fluorocarbon compound available from 3M Company under their designation FC 129. This latter material is a fluoroalkyl-sulphonate of potassium. In each case in which the beads were coated, the coating was formed by mixing the beads with a solution of the coating agent and then drying the beads to leave coating deposits of the amounts indicated in grams of the coating agent per kilogram of the beads. The results are shown in Table I.

TABLE I

| Bead coating agent | Quantity | Impact Resistance (Gardner) |
|---|---|---|
| Uncoated beads* | 0.00 g/kg | 9.4 kJ/m$^2$ |
| Amino-silane* | 1.20 | 7.45 |
| Phenyl-silane | 0.80 | 10.6 |
| Methyl-silane | 0.80 | 10.3 |
| FC 129 | 0.80 | 10.8 |

* = Not according to the invention.

Other samples of the same composition were extruded as pellets and then injection moulded into plates which were then subjected to the Charpy notched impact resistance test, in the as-moulded (unaged) and in the aged condition. Aging was effected by storing the samples at 23° C. at 50% relative humidity until equilibrium was reached. The results are shown in the following Table II.

TABLE II

| | Impact Resistance kJ/m$^2$ (Charpy) | |
|---|---|---|
| Bead coating agent | Unaged | Aged |
| Uncoated beads* | 3.6 | 6.4 |
| Amino-silane* | 3.1 | 5.2 |
| Phenyl-silane | 5.0 | 8.3 |
| Methyl-silane | 5.2 | 8.4 |
| FC 129 | 5.4 | 8.2 |
| Unfilled nylon* | 9 to 13 | 35 to 45 |

* = Not according to the invention

It was also found that when the amount of FC 129 fluorocarbon compound was reduced to 0.20 g/kg of the beads, similar results were still given.

I claim:

1. A polymeric article comprising a synthetic polymer matrix and a filler material, the synthetic polymer matrix being comprised of a synthetic polymer selected from the group consisting of polyamides, polystyrenes, epoxy resins, and polyester resins, and the filler material being comprised of glass beads bearing at least one coating of at least two coating agents, which at least two coating agents comprise at least one silicon-functional silane, and at least one synthetic polymer, which at least one synthetic polymer has either a glass transition temperature ($T_g$) which is lower than 15° C. or shock-absorbing properties and is selected from the group consisting of polymers and copolymers of butadienes, acrylonitriles, acrylates and aliphatic urethanes, wherein said glass beads have a total coating amount ranging from 0.02 up to 1% by weight based on the weight of uncoated glass beads, and wherein said at least one coating limits adhesion between the glass beads and the synthetic polymer matrix and confers an increased impact resistance on the article as compared with an article which includes uncoated glass beads as filler material but is otherwise identical.

2. The polymeric article according to claim 1, wherein said synthetic polymer has a glass transition temperatures ($T_g$) which is lower than 15° C.

3. The polymeric article according to claim 1, wherein said at least one silicon-functional silane comprises a mixture of at least two different silanes and forms an interfacial bond of a strength intermediate that attainable by either of two such silanes if used alone.

4. The polymeric article according to claim 1, wherein said at least one synthetic polymer comprises a styrene-butadiene copolymer.

5. The polymeric article according to claim 1, wherein said at least one synthetic polymer comprises copoly-($NH_2$-butadiene-acrylonitrile-$NH_2$).

6. The polymeric article according to claim 1, wherein said at least one synthetic polymer comprises copoly-(butylacrylate-epoxyacrylate).

7. The polymeric article according to claim 1, wherein said coating amount ranges from 0.02 up to 0.2% by weight.

8. The polymeric article according to claim 1, wherein said coating amount is not more than 0.1% by weight.

9. The polymeric article according to claim 1, wherein said at least one silicon-functional silane is one of an alkyl-silane and an aryl-silane.

10. The polymeric article according to claim 9, wherein said at least one silicon-functional silane is one of a methyl-silane and a phenyl-silane.

11. The polymeric article according to claim 1, wherein said at least one silicon-functional silane comprises a mixture of two different silicon-functional silanes and forms an interfacial bond of a strength intermediate that is attainable by either of two such silanes if used alone, respectively.

12. The polymeric article according to claim 1, wherein the at least two coating agents further comprise a silane, the silicon-functional silane and the silane forming a mixture of silanes, which mixture forms an interfacial bond of a strength intermediate that attainable by either of two such silanes if used alone, respectively.

13. Coated glass beads suitable for use as a filler material for synthetic polymers, said coated glass beads comprising glass beads bearing at least one coating of at least two coating agents, which at least two coating agents comprise at least one silicon-functional silane, and at least one synthetic polymer, which at least one synthetic polymer has either a glass transition temperature ($T_g$) which is lower than 15° C. or shock-absorbing properties and is selected from the group consisting of polymers and copolymers of butadienes, acrylonitriles, acrylates and aliphiatic urethanes, said coated glass beads having a total coating amount ranging from 0.02 up to 1% by weight based on the weight of uncoated glass beads.

* * * * *